United States Patent
Chen et al.

(10) Patent No.: US 11,564,138 B2
(45) Date of Patent: *Jan. 24, 2023

(54) RESOLVING FREQUENCY CONFLICTS AMONG MULTIPLE NETWORK OPERATORS

(71) Applicant: Apple Inc., Cupertino, CA (US)

(72) Inventors: Yuqin Chen, Shenzhen (CN); Dawei Zhang, Saratoga, CA (US); Fangli Xu, Beijing (CN); Haijing Hu, Beijing (CN); Longda Xing, San Jose, CA (US); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Xu Ou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,488

(22) Filed: Mar. 7, 2022

(65) Prior Publication Data
US 2022/0191757 A1 Jun. 16, 2022

Related U.S. Application Data

(63) Continuation of application No. 16/480,767, filed as application No. PCT/CN2018/099135 on Aug. 7, 2018, now Pat. No. 11,290,933.

(51) Int. Cl.
*H04W 4/00* (2018.01)
*H04W 36/10* (2009.01)
(Continued)

(52) U.S. Cl.
CPC ..... *H04W 36/10* (2013.01); *H04W 36/00835* (2018.08); *H04W 36/08* (2013.01); *H04W 36/14* (2013.01)

(58) Field of Classification Search
CPC ......... H04W 36/0005; H04W 36/0058; H04W 36/0061; H04W 36/0066; H04W 36/0069;
(Continued)

(56) References Cited

U.S. PATENT DOCUMENTS

2006/0166694 A1 7/2006 Jeong et al.
2015/0327144 A1 11/2015 Dalsgaard et al.

FOREIGN PATENT DOCUMENTS

CN 1863370 A 11/2006

OTHER PUBLICATIONS

International Search Report and Written Opinion for PCT/CN2018/099135; 9 pages; dated Apr. 28, 2019.

*Primary Examiner* — Matthew W Genack
(74) *Attorney, Agent, or Firm* — Kowert, Hood, Munyon, Rankin & Goetzel, P.C.

(57) ABSTRACT

Apparatuses, systems, and methods for a wireless device avoiding reselection or handover to cells of different operators. The wireless device may attach to a first base station of a first network operator. The wireless device may determine that a neighboring base station is associated with a second network operator. Based on determining the neighboring base station is associated with the second network operator, the wireless device may exclude the third base station from handover or reselection.

20 Claims, 8 Drawing Sheets

(51) Int. Cl.
*H04W 36/00* (2009.01)
*H04W 36/08* (2009.01)
*H04W 36/14* (2009.01)

(58) Field of Classification Search
CPC ....... H04W 36/0083; H04W 36/00835; H04W 36/0085; H04W 36/0088; H04W 36/0094
See application file for complete search history.

RESOLVING FREQUENCY CONFLICTS AMONG MULTIPLE NETWORK OPERATORS

PRIORITY INFORMATION

This application is a continuation of U.S. patent application Ser. No. 16/480,767, entitled "Resolving Frequency Conflicts Among Multiple Network Operators," filed Jul. 25, 2019, which is a national phase entry of PCT application number PCT/CN2018/099135, entitled "Resolving Frequency Conflicts Among Multiple Network Operators," filed Aug. 7, 2018, which are hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for resolving frequency conflicts among multiple network operators.

DESCRIPTION OF THE RELATED ART

Wireless communication systems are rapidly growing in usage. There exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi, and WiGig), IEEE 802.16 (WiMAX), Bluetooth, and others.

With the increasing number of wireless communication technologies in existence, it has become more common for wireless devices to include multiple antennas and/or multiple radios to implement various wireless communication technologies. Some standards (e.g., recent versions of IEEE 802.11ad and 802.11ay) use directional wireless technique to improve the system performance.

Further, wireless communication technology has evolved from voice-only communications to also include the transmission of data, such as Internet and multimedia content. Additionally, interference and collisions between transmissions of one or multiple radio access technologies (RATs) are increasingly possible (e.g., in unlicensed spectrum). For example, collisions may be possible between transmissions, e.g., between 5G/cellular transmissions and/or wireless local area network (WLAN) transmissions. Interference and collisions may degrade the wireless ecosystem and lead to negative impacts on users, e.g., of both RATs. Thus, improvements in the field are desired.

SUMMARY

Embodiments relate to apparatuses, systems, and methods for resolving frequency conflicts among multiple network operators.

A wireless device or UE may communicate with a first base station of a first network operator. For example, the wireless device may attach or camp on the first base station.

While attached to the first base station, the wireless device may perform measurement of a plurality of neighboring base stations, including a second base station of the first network operator and a third base station of a second network operator.

The wireless device may determine that the third base station is associated with the second network operator. For example, the wireless device may read an information block, such as system information block 1 (SIB1) of the third base station and determine that the network operator identity of the third cell is the second network operator.

Based on determining the third base station is associated with the second network operator, the wireless device may exclude the third base station from a measurement report.

The wireless device may then provide the measurement report to the first base station, where the measurement report includes a measurement of the second base station and excludes a measurement of the third base station.

The techniques described herein may be implemented in and/or used with a number of different types of devices, including but not limited to base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings.

Figure 1:
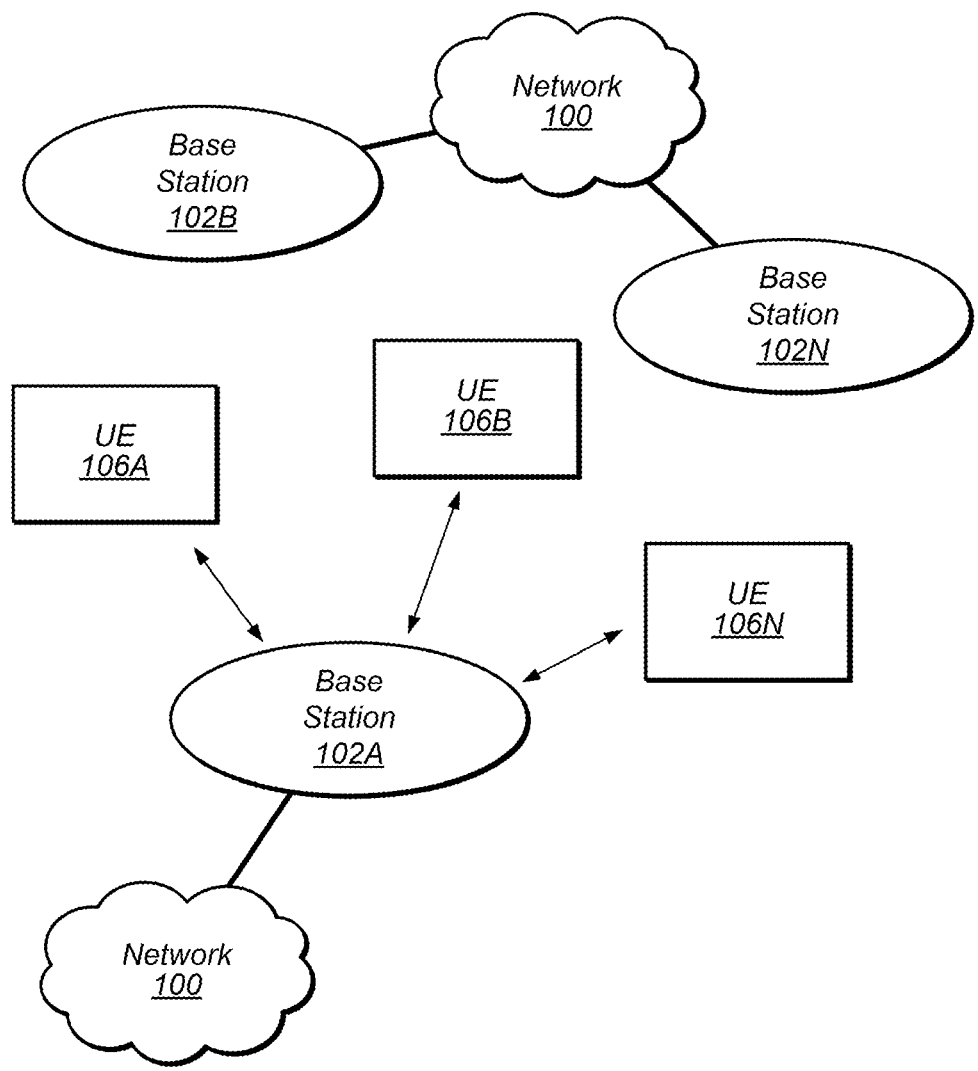
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication. A UE capable of operating according to 5G standards may be referred to as a new radio unit (NRU).

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

IEEE 802.11—refers to technology based on IEEE 802.11 wireless standards such as 802.11a, 802.11.b, 802.11g, 802.11n, 802.11-2012, 802.11ac, 802.11ad, 802.11ay, and/or other IEEE 802.11 standards. IEEE 802.11 technology may also be referred to as "Wi-Fi" or "wireless local area network (WLAN)" technology.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
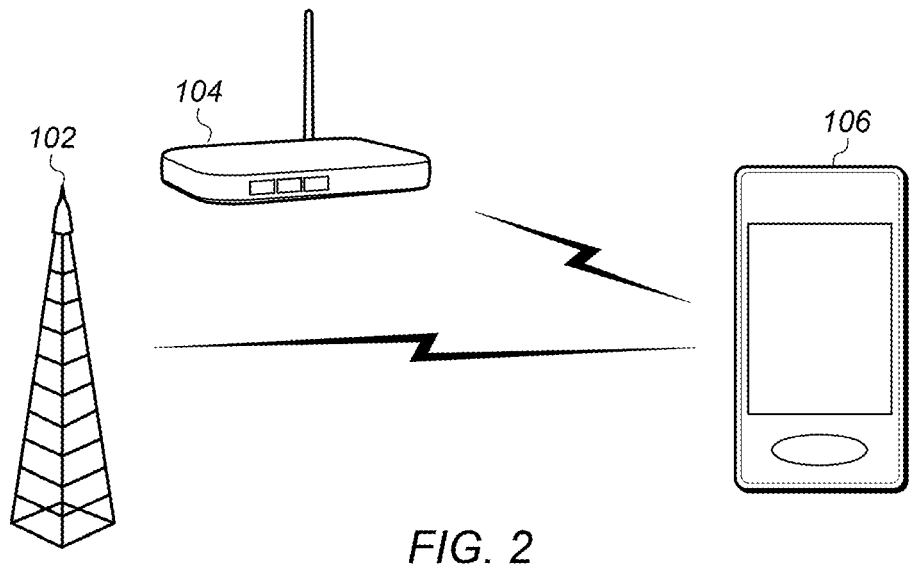
FIG. 2 illustrates a base station (BS) and an access point (AP) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE) or "new radio unit" (NRU). Thus, the user devices 106 are referred to as UEs, UE devices, or NRUs.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NG core (NGC) network. In addition, a gNB cell may include one or more transmission and reception points (TRPs). In addition, a UE capable of operating according to 5G NR may be connected to one or more TRPs within one or more gNBs.

In some embodiments, base station 102A may be (or may include) an access point (AP). The base station 102A may be capable of communicating using one or more wireless local area network (WLAN) communication standards. For example, the base station 102A may be capable of communicating using IEEE 802.11 standards (e.g., Wi-Fi).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 and an access point 104, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

The access point 104 may be an access point providing a wireless local area network (WLAN). The access point 104 may be equipped to communicate with a network 100 (e.g., a wide area network (WAN), such as the Internet, among various possibilities). Thus, the access point 104 may facilitate communication between the UEs 106 and/or between the UEs 106 and the network 100. The access point 104 and the UEs 106 may be configured to communicate over the transmission medium using Wi-Fi, including any of various versions of IEEE 802.11 (e.g., a, b, g, n, ac, ad, ay, wake-up radio (WUR), etc.).

In some embodiments, the WLAN may be an ad hoc network, e.g., using Personal Basic Service Set (PBSS) architecture, e.g., as defined in IEEE 802.11 ad. In such cases, the role of access point 104 may be performed by a UE device (e.g., one of the UEs 106) acting as a PBSS Control Point (PCP). For convenience, the terms "access point" and "AP/PCP" may be used herein to include an access point or PCP.

Figure 3:
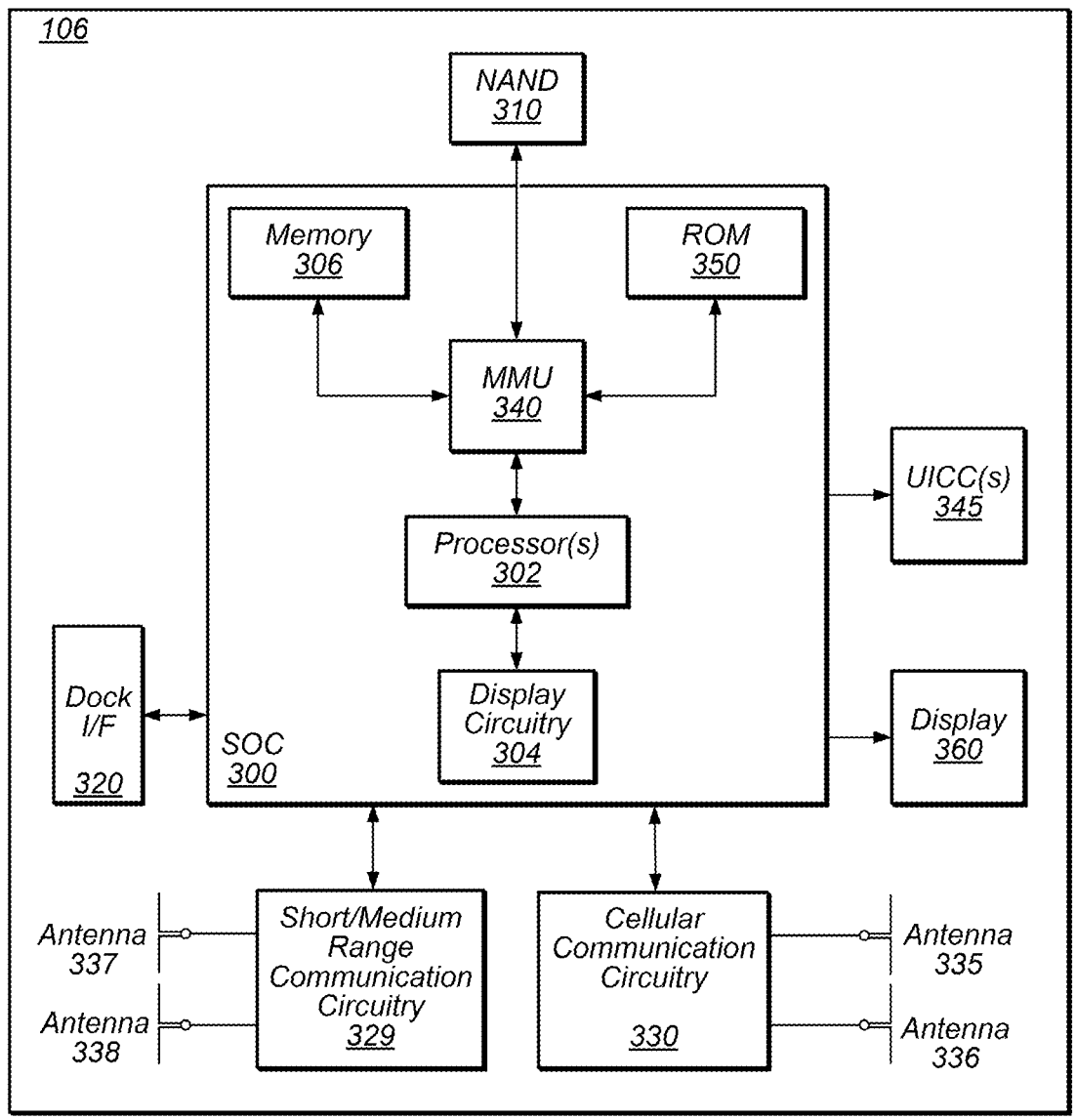
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a new radio unit (NRU), a mobile device or mobile station (STA), a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry (e.g., IEEE 802.11, Wi-Fi)). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The antennas may be grouped into any number of antenna arrays, each containing any number of antennas. The short to medium range wireless communication circuitry 329 may also couple (e.g., communicatively; directly or indirectly) to one or more antennas, such as antennas 337 and 338 as shown, which may also be grouped into antenna arrays. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
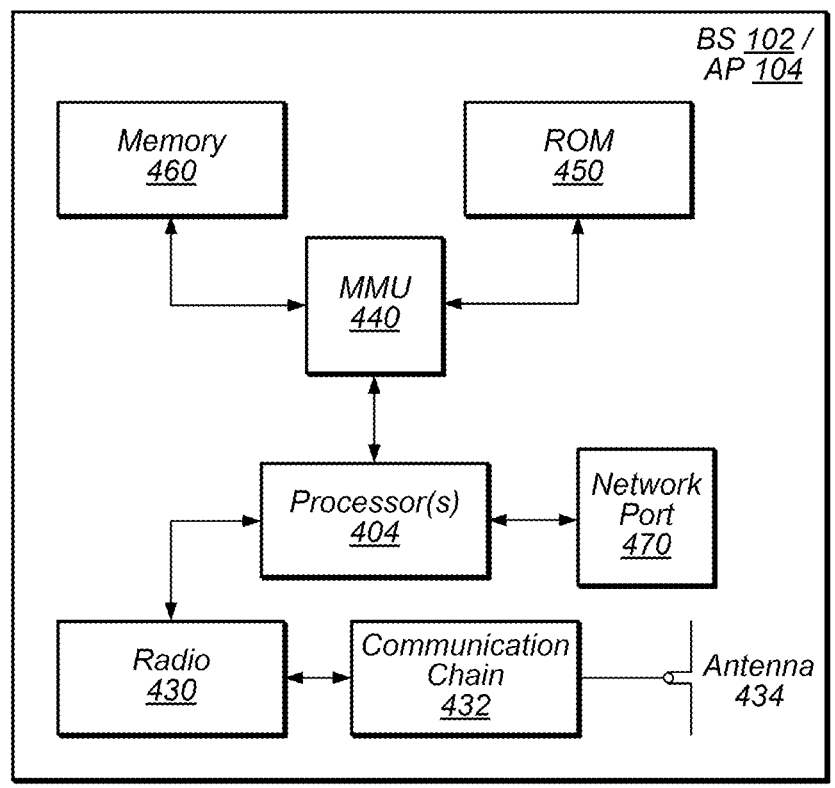
FIG. 4 illustrates an example block diagram of a B S/AP according to some embodiments.

FIG. 4—Block Diagram of a Base Station/Access Point

FIG. 4 illustrates an example block diagram of a base station 102/access point 104, according to some embodiments. For convenience, the term base station is used for the remainder of the description of FIG. 4. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a network (e.g., a telephone network and/or the internet) and provide a plurality of devices, such as UE devices 106, access to the network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NG core (NGC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station (BS) 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and WLAN/Wi-Fi, LTE and WLAN/Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
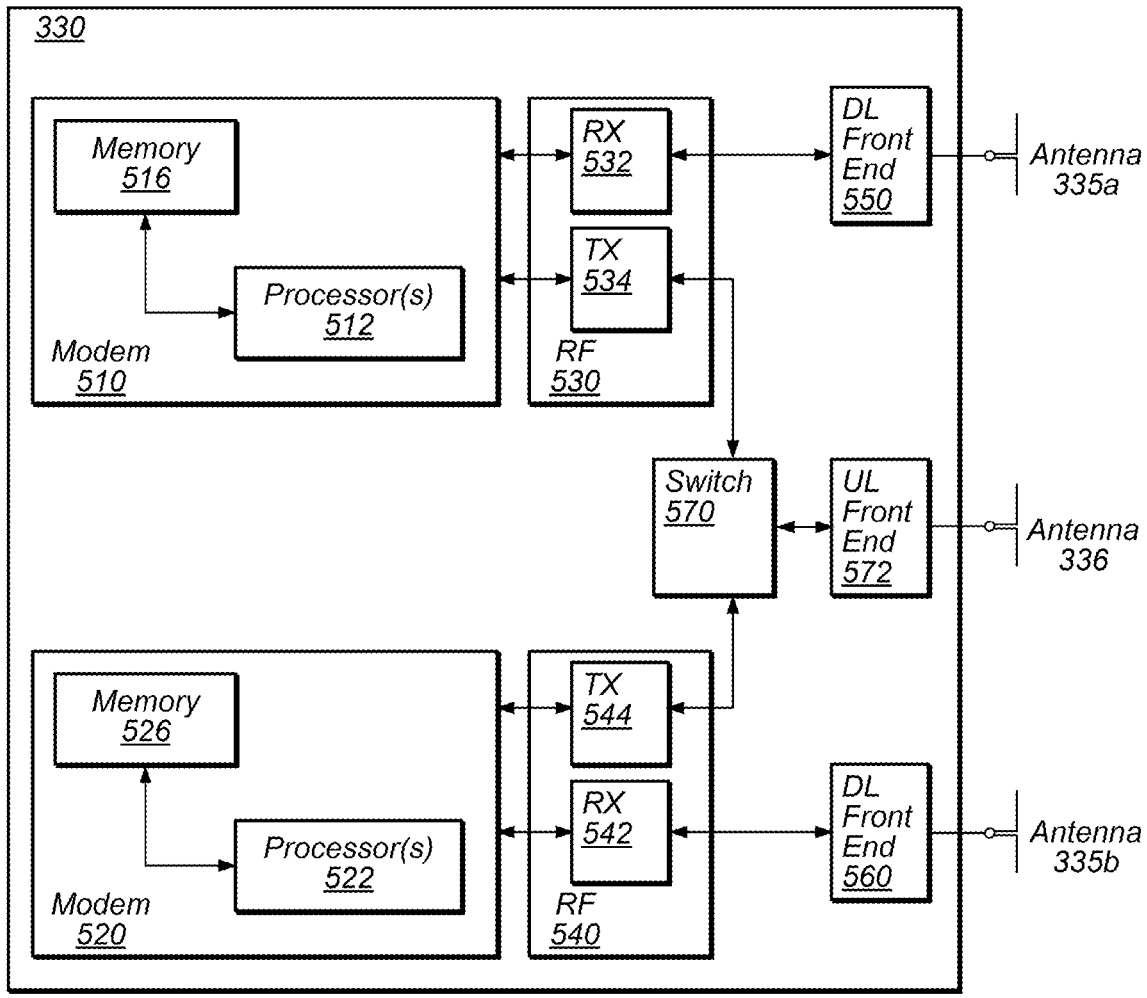
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106, BS 102, or AP 104, described above. As noted above, communication device 106 may be a user equipment (UE) device, NRU, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). Any number of antennas may be included in each of one or more antenna arrays. An antenna switch block (not shown) may be included to switch between antennas and/or antenna arrays. Multiple antennas may be used for single or multiple spatial streams (e.g., directional streams or beams for transmitting or receiving, e.g., Tx or Rx beams). Thus, the wireless device may be able to communicate according to standards that include directional functionality (e.g., 5G). Similarly, the wireless device may also be able to implement directional multi-gigabit (DMG) or enhanced directional multi-gigabit (EDMG) functionality, such as IEEE 802.11 ad and ay. The device may use a plurality of different antenna patterns (e.g., within a single array or potentially multiple antenna arrays) to transmit/receive for different directional sectors/beams. The device may sweep through beams and attempt to select a preferred/best beam (e.g., that offers the best transmission/reception characteristics).

In some embodiments, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second RAT, wherein the second cell operates in a second system bandwidth. The first and second system bandwidth may be the same, they may be separate, or they may overlap. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

It will be appreciated that the illustrated circuitry is exemplary only. In some embodiments, (different numbers of modems, RF front ends, DL front ends, UL front ends, switches, and/or antennas are possible, and may be configured as desired.

Figure 6A:
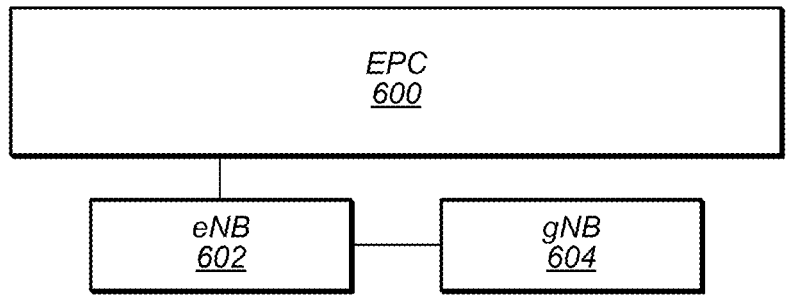
FIG. 6A illustrates an example of connections between an EPC network, an LTE base station (eNB), and a 5G NR base station (gNB), according to some embodiments.
Figure 6B:
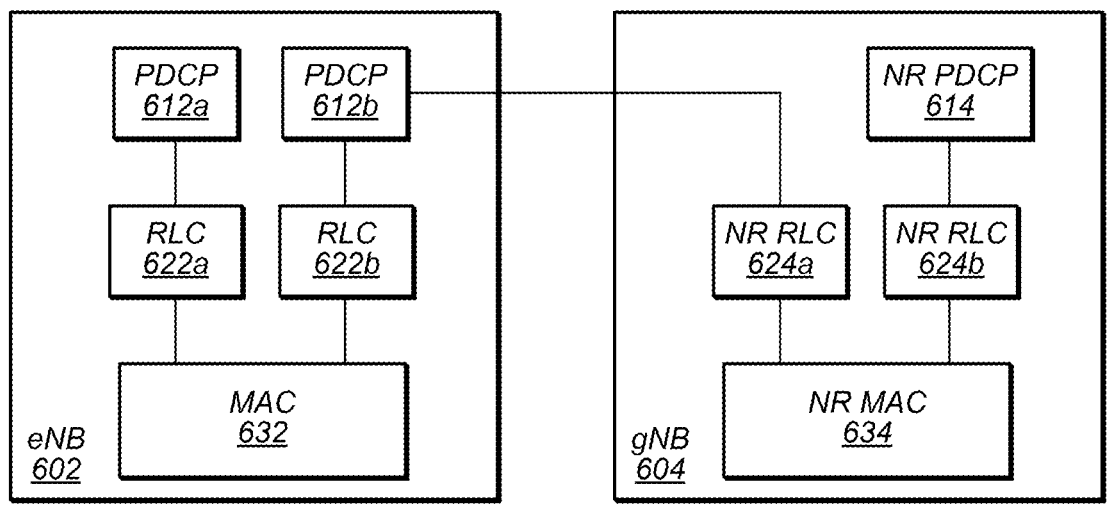
FIG. 6B illustrates an example of a protocol stack for an eNB and a gNB, according to some embodiments.

FIGS. 6A-6B: 5G NR Non-Standalone (NSA) Operation with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 622b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

In general, a non-stand alone (NSA) implementation employs dual connectivity in both uplink (UL) and downlink (DL). In other words, dual connectivity requires two active radio links in both UL and DL. In some implementations, depending on frequency band combinations, two (substantially) concurrent UL connections may cause receiver sensitivity degradation at the UE. For example, in some proposed implementations, a UE may be required to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a $5^{th}$ order intermodulation product (IM5) produced at a 5G NR transmitter of the UE from a $2^{nd}$ harmonic of LTE UL band 3 and NR UL may fall into LTE DL band 7 frequencies during (substantially) simultaneous UL operation. Similarly, a $4^{th}$ order harmonic of LTE UL band 20 and NR UL transmission may create a $5^{th}$ order intermodulation product that may interfere with LTE DL band 7 reception and thus desensitize a receiving for LTE DL band 7.

In addition, future specifications NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

In some embodiments, a UE, such as communication device 106, may support LTE and NR co-existence on specific bands and/or frequencies. In addition, a UE may determine that for a band combination, UL sharing in NSA mode may be required to avoid receiver sensitivity degradation. Thus, the UE may need to inform the network that UL sharing mode will be used for the LTE/NR band combination. In some embodiments, a conditional field may be added to a UE capability message. The conditional field may indicate whether UL sharing mode will be used for the allocated band combination. In addition, the conditional field may indicate which bands/frequencies that the UE supports NSA operations. Note further that in some embodiments, e.g., as further described below, the UE may be configured to perform NSA operations via time division multiplexing (TDM). However, in other embodiments, the UE may be configured to perform NSA operations via other mechanisms such as frequency division multiplexing (FDM) or MAC layer multiplexing.

Multiple Network Operators Using Similar Frequencies

Within licensed spectrum, it's unlikely for multiple network operators to share the same frequency in a region as each network operator has different assigned frequencies. However, for unlicensed spectrum, e.g., under NR-U, it is possible for multiple network operators share the same spectrum or use the same or overlapping frequencies.

Figure 7:
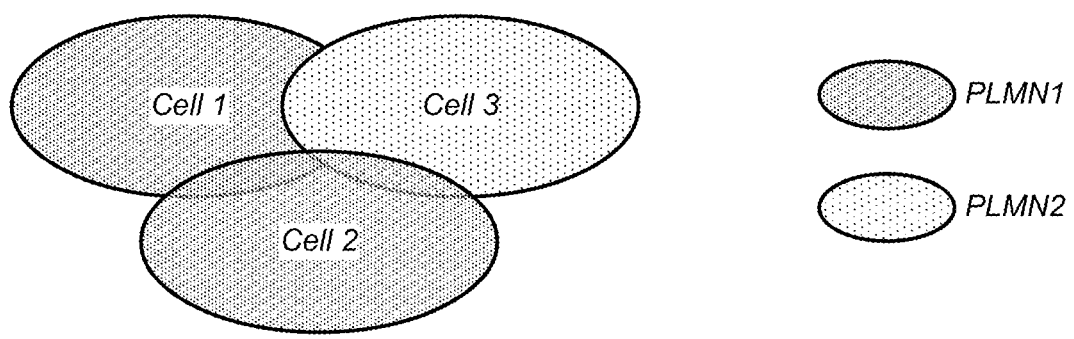
FIG. 7 illustrates an exemplary network environment involving potential conflicts between cells of different network operators, according to some embodiments.

FIG. 7 illustrates an exemplary wireless environment with overlapping cells of different network operators or public land mobile networks (PLMNs). As shown, cells 1 and 2 are associated with a first PLMN while cell 3 (which overlaps with cells 1 and 2) are associated with a second PLMN. In this embodiment, cell 3 has overlapping frequencies with cells 1 and/or 2.

Currently, cell reselection does not require a check of the identity of a network operator for a target cell as within licensed spectrum a same frequency range would necessarily belong to a same network operator. However, because different network operators can use the same frequencies in unlicensed spectrum (e.g., as shown in FIG. 7), this reselection behavior may result in a UE performing reselection to a cell that is a different network operator than the source cell, resulting in a failed reselection and a poor user experience.

Additionally, according to current standards (e.g., within TS 38.304), the UE may operate in the following manner: "If the highest ranked cell or best cell according to absolute priority reselection rules is an intra-frequency or inter-frequency cell which is not suitable due to belonging to a PLMN which is not indicated as being equivalent to the registered PLMN, the UE shall not consider this cell and other cells on the same frequency, as candidates for reselection for a maximum of 300 seconds." Thus, a failed reselection to a cell of a different PLMN may result in the UE being prevented (if following current standard) from reselecting to any other cell in the same frequency range.

Using the example of FIG. 7, a failed reselection from cell 1 to cell 3 could result in a 300 second lock-out of a reselection from cell 1 to cell 2. This issue may be resolved according to a number of different embodiments.

In some embodiments, the UE may be configured to identify the network operator (e.g., PLMN or EPLMN) of target cell(s) in order to avoid reselection to a different network operator (e.g., different than the network operator of the originating cell and/or different than network operators(s) that the UE is a subscriber of). For example, the UE may be configured to read SIB1 to identify the identity of the network operator for potential target cells. The UE may be configured to read SIB1 at any of various points during the reselection process. For example, the UE may read SIB1 to determine the network operator identity before any cell ranking of target cells for reselection, thereby limiting the ranked cells to be only those with the same network operator (or network operator(s) to which the UE is subscribed). Alternatively, the UE may read SIB1 of a neighbor or potential target cell while Tresel is running, e.g., in order to avoid delay reselection due to SIB1 reading duration. The UE would again avoid selection of a cell of a non-allowed network operator according to this embodiment, e.g., by removing any target cells of non-allowed network operators from the ranked list.

In some embodiments, the network operator may assist the UE in avoiding cells of different network operators. For example, the network operator may transmit (e.g., via the originating cell) a blacklist containing the identities of cells belonging to different network operators. The network may be able to do this by collecting cell information (such as the PCI (physical cell identity) and/or CGI/NCGI (cell global identification/NR cell global identification) of neighboring cell(s), e.g., using automatic neighbor relation (ANR). Upon collecting this information, the network may identify cells that belong to other network operators and add those cells to the blacklist (e.g., adding the PCI and/or NCGIs to the blacklist). As a result, the UE may be configured to use the blacklist to avoid reselection to those cells, e.g., by removing them from consideration, ensuring they are not ranked during the reselection process, or any other appropriate method.

In some embodiments, when the UE inadvertently reselects to a cell of a different network operator, rather than following the 300 second lock-out period specified by the standard, it may immediately reselect to a different cell from the ranking list.

Figure 8:
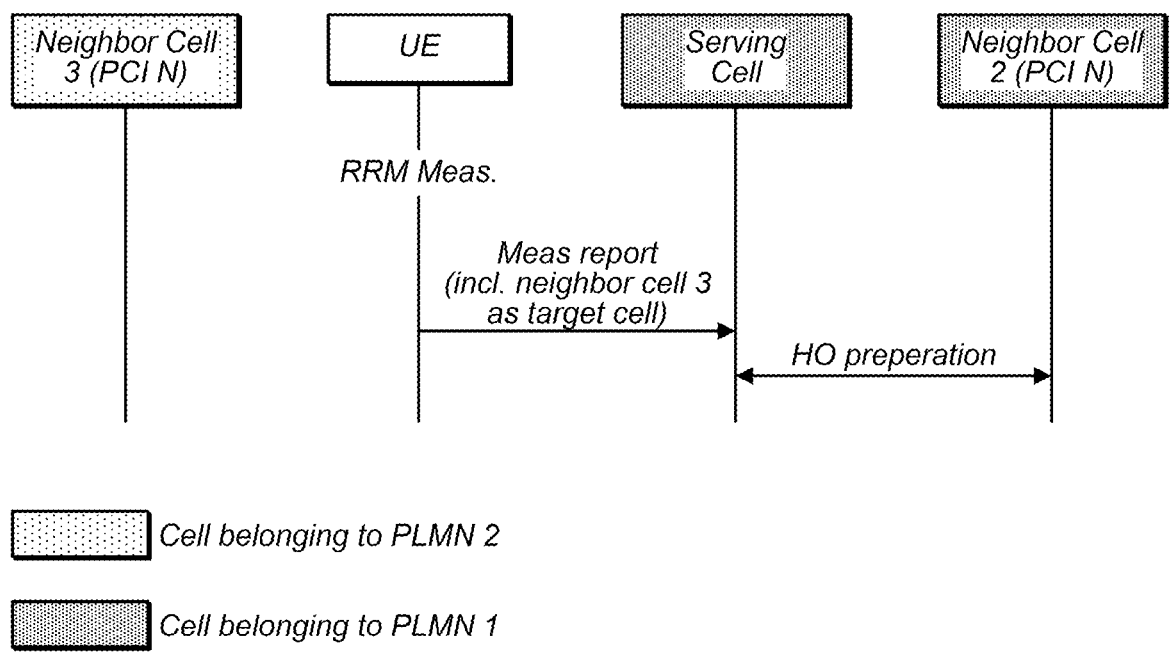
FIG. 8 illustrates a message flow diagram related to handover to a cell of a different network operator having a same identity, according to some embodiments.

Another similar issue may occur when there is an identity collision among cells of different network operators. For example, it is possible that a cell of a first network operator and a cell of a second network operator to have the same PCI and have same or overlapping frequencies, e.g., cell 2 and cell 3 of FIG. 7 could have a same PCI. This situation is illustrated in the message flow diagram of FIG. 8.

Similar to the situation described above, e.g., during radio resource management (RRM) measurement, a UE may not read SIB1 of the target cell to identify the network operator. Accordingly, the UE may report the PCI of neighbor cell 3, which belongs to different network operator, to the serving cell. However, in this situation, the reported PCI of neighbor cell 3 is the same as the PCI of neighbor cell 2, which is the same as the network operator of cell 1. Thus, the serving cell 1 may assume and begin handover preparation for cell 2, even though the UE is actually measuring/targeting neighbor cell 3 of a different operator for handover. As a consequence, UE cannot access neighbor cell 3, e.g., due to RACH failure upon attempting attachment to a network operator that it is not subscribed to. Additionally, because cell 3 was ranked above cell 2 for handover, the UE may not be able to handover to cell 2, e.g., due to cell 2's signal being too weak. Thus, an attempt to attach to cell 2, e.g., after failure to attach to cell 3, may result in RACH failure.

In some embodiments, similar to embodiments above, the UE may be configured to read SIB1 to get network operator information of neighbor cells, e.g., during RRM measurement. Thus, the UE may be configured to determine the network operator identity in order to avoid measurement and/or attempted handover to a non-allowed network operator. In some embodiments, to speed up the PLMN reading, NCGI and/or network operator specific information may be specified in SSB (synchronization signal block) or special reference signal (RS) or MIB (master information block) transmission(s). Similar to above, while the network operator identity information may be read during RRM measurement, it may be read at any other viable time as well. For example, the UE may be configured to identify the network operator (e.g., by reading the SIB1) while the time to trigger (TTT) is running. For example, if the UE identifies that the network operator is different than its network operator (e.g., the network operator of the originating cell), the UE may cancel the TTT and not trigger transmitting a measurement report for that neighbor cell. This may mean that the UE does not have to wait to start TTT (e.g., by reading SIB1 before starting TTT).

Additionally, it is possible that a threshold could be used (e.g., specified by the network) for reading the network operator identity information of a target cell. This threshold may keep the measurement latency in a tolerable range and result in an acceptable idle mode measurement and/or SIB read load on the UE. In one embodiment, the threshold could be based on the absolute value of RSRP/RSRQ value of neighbor cells. Thus, the UE may only read the network identity information (e.g., in SIB1) of neighbor cells having a RSRP/RSRQ quantity higher than this absolute threshold. Alternatively, or additionally, the threshold may be based on a relative delta of RSRP/RSRQ value of the neighbor cells. Thus, the UE may only read network identity information of neighbor cells having RSRP/RSRQ delta over the current serving cell higher than this relative delta threshold.

In some embodiments, a validity timer (e.g., configured by the network) may be used for a neighbor cell's network identity (e.g., SIB1) reading. After the timer expires, the UE may need to reacquire this neighbor cell's network identity (e.g., SIB 1).

In some embodiments, the UE may be configured to report the handover failure (HOF) to the cell of the other network operator (e.g., cell 3 of FIGS. 7 and 8) to its network operator, e.g., after RRC reestablishment. The UE may be configured to indicate the HOF reason as being a PCI collision between two different network operators. At the same time, the reporting UE may be configured to bar this cell for a duration (e.g., which could be fixed or configured by the network, as desired). The network could be configured to resolve the conflict (e.g., by assigning a new PCI to neighbor cell 2) and/or provide information to UEs in the area to avoid handover to neighbor cell 3.

Figure 9:
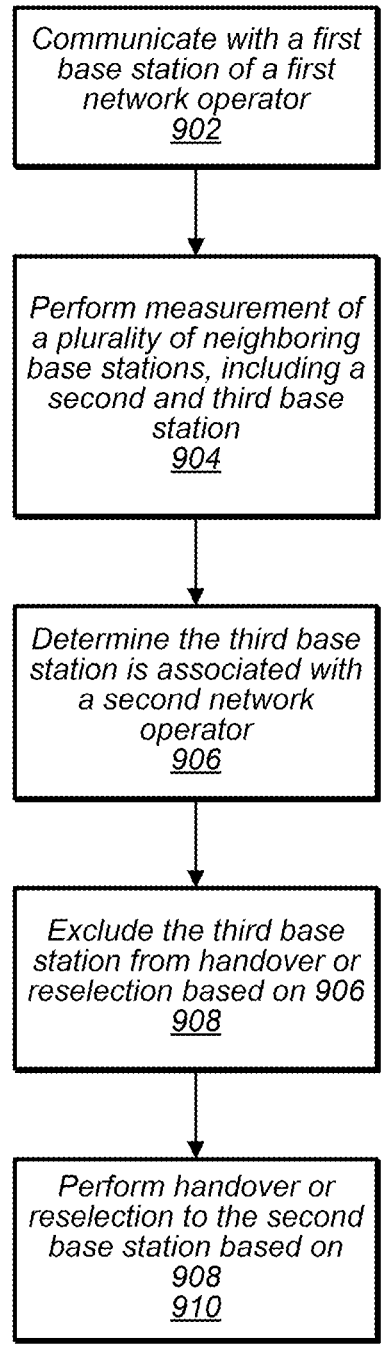
FIG. 9 illustrates an exemplary method for avoiding reselection or handover to cells of a different network operator on a similar frequency, according to some embodiments.

FIG. 9—Avoiding Reselection to Base Stations of a Different Network Operator

FIG. 9 is a flowchart diagram illustrating a method for avoiding reselection or handover to base stations of a different network operator. Aspects of the method of FIG. 9 may be implemented by a wireless device, a base station, and/or a network, such as a UE 106, the BS 102, and/or the network 100 (e.g., a 5G AMF) illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired. As shown, the method of FIG. 9 may operate as follows.

In 902, a wireless device or UE may communicate with a first base station of a first network operator. For example, the wireless device may attach or camp on the first base station.

In 904, while attached to the first base station, the wireless device may perform measurement of a plurality of neighboring base stations, including a second base station of the first network operator and a third base station of a second network operator. The measurement may be performed in response to any of various triggers, as desired. For example, a signal quality of the first base station may fall below a measurement threshold. Alternatively, or additionally, the measurement may be performed based on a schedule or in response to a timer completing to perform measurements.

In 906, the wireless device may determine that the third base station is associated with the second network operator. For example, the wireless device may read an information block, such as system information block 1 (SIB1) of the third base station and determine that the network operator identity of the third base station is the second network operator. Reading the information block may include determining a PCI or NCGI of the third base station. As noted above, in some embodiments, NCGI and/or network operator specific information could be provided in and/or read from information in SSB or special RS or MIB transmission. Thus, the network operator identity could be determined from any number of places.

In some embodiments, the determination in 906 may be performed as part of the measurement in 904 or at a later time. For example, in one embodiment, the wireless device may always perform the determination before cell ranking (and therefore only rank valid cells). As another example, the measurement may be associated with reselection and 906 may be performed during a reselection timer. Alternatively, the measurement may be associated with handover and 906 may be performed during TTT. Additionally, this determination may be performed in the situation where the second and third base stations have a same PCI, as discussed previously.

Note that 906 may also apply to the second base station, except that the wireless device determines that the second base station is associated with the first network operator. Thus, determining the associated network identity may be performed for all or a subset of the neighboring base stations selected for measurement. However, in some embodiments, this identification may only be performed for base stations that meet a threshold quality level. For example an absolute or relative signal quality threshold may be used to determine whether to determine the network operator identity of the respective base station in the measurement list.

As another possibility, rather than reading specific information broadcast by the third base station, the wireless device could receive and/or use a blacklist broadcasted by the first network operator (e.g., via the first base station). The blacklist may identify the third base station (e.g., by its PCI) as belonging to a different network operator, thereby allowing the wireless device to use the blacklist to avoid reporting those invalid base stations in a measurement report or reselecting to those invalid base stations.

In 908, the wireless device may exclude the third base station from reselection or handover. For example, for handover, the wireless device may exclude the third base station from a measurement report. For example, the wireless device may provide the measurement report to the first base station, where the measurement report includes a measurement of the second base station and excludes a measurement of the third base station.

Note that the exclusion of the third base station could occur at any of various points in the process. For example, the third base station may be removed prior to ranking the measured neighboring base stations. Alternatively, or additionally, the base station could be removed at a later point, e.g., upon determining that the third base station is associated with the second network operator in 906. As one specific example, if the wireless device determines the third base station is associated with the second network operator during TTT, the wireless device may cancel the TTT and may not trigger a measurement report for the third base station.

In 910, the wireless device may perform handover or reselection to a base station other than the third base station, e.g., the second base station.

In some embodiments, where the wireless device has handed over or reselected a base station (e.g., the third base station) that is not a network operator to which the wireless device is subscribed (e.g., different than the network operator of the first base station), the wireless device may immediately hand over to a base station of a valid network operator (e.g., the next valid base station in the ranking list). The wireless device may also report the failed handover to the network.

Embodiments

The following paragraphs present exemplary, non-limiting embodiments corresponding to various portions of the description provided above.

In one embodiment, an apparatus configured for inclusion in a wireless device, the apparatus comprising: one or more processing elements, wherein the one or more processing elements are configured to: communicate with a first base station of a first network operator; measure a plurality of neighboring base stations, including a second base station of the first network operator and a third base station of a second network operator; decode a first system information block (SIB) of the third base station; determine the third base station is associated with the second network operator based on decoding the first SIB; based on determining the third base station is associated with the second network operator, exclude the third base station from handover or reselection; and perform handover or reselection excluding the third base station.

In some embodiments, said excluding the third base station from handover or reselection comprises excluding the third base station from a measurement report, wherein the one or more processing elements are further configured to provide the measurement report to the first base station.

In some embodiments, the one or more processing elements are further configured to: perform handover to the second base station from the first base station based on the measurement report.

In some embodiments, the measurement is associated with reselection, wherein the one or more processing elements are further configured to: perform reselection to the second base station based on the measurement.

In some embodiments, decoding the first SIB of the third base station is performed before cell ranking of the plurality of neighboring base stations.

In some embodiments, said decoding the first SIB of the third base station is performed during a reselection timer.

In some embodiments, said decoding the first SIB of the third base station is performed during radio resource management (RRM) measurement.

In some embodiments, said decoding the first SIB of the third base station is performed during a time to trigger (TTT) timer.

In some embodiments, the first SIB is SIB1.

In some embodiments, said decoding the first SIB of the third base station is based on comparing a signal quality of the third base station to a signal quality threshold.

In some embodiments, a wireless device, comprising: an antenna; a radio coupled to the antenna; and a processing element coupled to the radio, wherein the processing element is configured to: attach to a first base station associated with a first network operator; read a first information block (IB) of a second base station; determine the second base station is associated with a second network operator, different from the first network operator; based on determining the second base station is associated with the second network operator, excluding the second base station for handover or reselection; and perform handover or reselection to a third base station associated with the first network operator.

In some embodiments, said reading the first IB and said determining the second base station is associated with the second network operator is performed prior to a timer associated with reselection or handover.

In some embodiments, said reading the first IB is performed during a measurement process.

In some embodiments, said reading the first IB and said determining the second base station is associated with the second network operator is performed after starting a timer associated with reselection or handover.

In some embodiments, the first IB is SIB1.

In some embodiments, a method for operating a wireless device, the method comprising: at the wireless device: communicating with a first base station of a first network operator; performing measurement of a plurality of neighboring base stations, including a second base station of the first network operator and a third base station of a second network operator; determining the third base station is associated with the second network operator; based on determining the third base station is associated with the second network operator, excluding the third base station from reselection; and performing reselection to the second base station based on excluding the third base station from reselection.

In some embodiments, determining the third base station is associated with the second network operator comprises reading system information block 1 (SIB1) of the third base station.

In some embodiments, determining the third base station is associated with the second network operator is performed while performing measurement of the third base station.

In some embodiments, said determining the third base station is associated with the second network operator is performed after performing measurement of the third base station.

In some embodiments, determining the third base station is associated with the second network operator comprises receiving a base station blacklist from the first network operator, wherein the base station blacklist includes the third base station.

A method that includes any action or combination of actions as substantially described herein in the Detailed Description and claims.

A method as substantially described herein with reference to each or any combination of the Figures contained herein, with reference to each or any combination of paragraphs in the Detailed Description, with reference to each or any combination of Figures and/or Detailed Description, or with reference to each or any combination of the claims.

A wireless device configured to perform any action or combination of actions as substantially described herein in the Detailed Description, Figures, and/or claims.

A wireless device that includes any component or combination of components as described herein in the Detailed Description and/or Figures as included in a wireless device.

A non-volatile computer-readable medium that stores instructions that, when executed, cause the performance of any action or combination of actions as substantially described herein in the Detailed Description and/or Figures.

An integrated circuit configured to perform any action or combination of actions as substantially described herein in the Detailed Description and/or Figures.

A mobile station configured to perform any action or combination of actions as substantially described herein in the Detailed Description and/or Figures.

A mobile station that includes any component or combination of components as described herein in the Detailed Description and/or Figures as included in a mobile station.

A mobile device configured to perform any action or combination of actions as substantially described herein in the Detailed Description and/or Figures.

A mobile device that includes any component or combination of components as described herein in the Detailed Description and/or Figures as included in a mobile device.

A network node configured to perform any action or combination of actions as substantially described herein in the Detailed Description and/or Figures.

A network node that includes any component or combination of components as described herein in the Detailed Description and/or Figures as included in a mobile device.

A base station configured to perform any action or combination of actions as substantially described herein in the Detailed Description and/or Figures.

A base station that includes any component or combination of components as described herein in the Detailed Description and/or Figures as included in a mobile device.

A 5G NR network node or base station configured to perform any action or combination of actions as substantially described herein in the Detailed Description and/or Figures.

A 5G NR network node or base station that includes any component or combination of components as described herein in the Detailed Description and/or Figures as included in a mobile device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   at least one processor, wherein the at least one processor is configured to cause a wireless device to:
   communicate with a first cell of a first public land mobile network (PLMN);
   measure a plurality of neighboring cells, including a second cell of the first PLMN and a third cell of a second PLMN, wherein the second cell of the first PLMN and the third cell of the second PLMN use a first frequency, wherein the second PLMN is not indicated as being equivalent to the first PLMN;
   when in licensed spectrum, exclude cells from a reselection on the first frequency based on the third cell belonging to the second PLMN;
   otherwise, exclude the third cell from the reselection based on the third cell belonging to the second PLMN; and
   perform the reselection excluding at least the third cell.

2. The apparatus of claim 1, wherein the third cell is the highest ranked cell based on said measuring.

3. The apparatus of claim 1, wherein the at least one processor is configured to:
   decode a first system information block (SIB) of the third cell; and
   determine the third cell is associated with the second PLMN based on decoding the first SIB.

4. The apparatus of claim 1, wherein the at least one processor is configured to determine the third cell is associated with the second PLMN before cell ranking of the plurality of neighboring cells.

5. The apparatus of claim 1, wherein the at least one processor is configured to determine the third cell is associated with the second PLMN during a reselection timer.

6. The apparatus of claim 1, wherein the at least one processor is configured to determine the third cell is associated with the second PLMN during radio resource management (RRM) measurement.

7. The apparatus of claim 1, wherein the at least one processor is configured to determine the third cell is associated with the second PLMN during a time to trigger (TTT) timer.

8. A wireless device, comprising:
   wireless communication circuitry; and
   at least one processor coupled to the wireless communication circuitry, wherein the at least one processor is configured to cause the wireless device to:
   communicate with a first cell of a first public land mobile network (PLMN);
   measure a plurality of neighboring cells, including a second cell of the first PLMN and a third cell of a second PLMN, wherein the second cell of the first PLMN and the third cell of the second PLMN use a first frequency, wherein the second PLMN is not indicated as being equivalent to the first PLMN;
   when in licensed spectrum, exclude cells from a reselection on the first frequency based on the third cell belonging to the second PLMN;
   otherwise, exclude the third cell from the reselection based on the third cell belonging to the second PLMN; and
   perform the reselection excluding at least the third cell.

9. The wireless device of claim 8, wherein the third cell is the highest ranked cell based on said measuring.

10. The wireless device of claim 8, wherein the at least one processor is configured to:
    decode a first system information block (SIB) of the third cell; and
    determine the third cell is associated with the second PLMN based on decoding the first SIB.

11. The wireless device of claim 8, wherein the at least one processor is configured to determine the third cell is associated with the second PLMN before cell ranking of the plurality of neighboring cells.

12. The wireless device of claim 8, wherein the at least one processor is configured to determine the third cell is associated with the second PLMN during a reselection timer.

13. The wireless device of claim 8, wherein the at least one processor is configured to determine the third cell is associated with the second PLMN during radio resource management (RRM) measurement.

14. The wireless device of claim 8, wherein the at least one processor is configured to determine the third cell is associated with the second PLMN during a time to trigger (TTT) timer.

15. A method for operating a wireless device, the method comprising:
    at the wireless device:
    communicating with a first cell of a first public land mobile network (PLMN);
    measuring a plurality of neighboring cells, including a second cell of the first PLMN and a third cell of a second PLMN, wherein the second cell of the first PLMN and the third cell of the second PLMN use a first frequency, wherein the second PLMN is not indicated as being equivalent to the first PLMN;
    when in licensed spectrum, excluding cells from a reselection on the first frequency based on the third cell belonging to the second PLMN;
    otherwise, excluding the third cell from the reselection based on the third cell belonging to the second PLMN; and
    performing the reselection excluding at least the third cell.

16. The method of claim 15, wherein the third cell is the highest ranked cell based on said measuring.

17. The method of claim 15, wherein the method comprises determining the third cell is associated with the second PLMN based on reading system information block 1 (SIB1) of the third cell.

18. The method of claim 15, wherein the method comprises determining the third cell is associated with the second PLMN while performing measurement of the third cell.

19. The method of claim 15, wherein the method comprises determining the third cell is associated with the second PLMN after performing measurement of the third cell.

20. The method of claim 15, wherein the method comprises determining the third cell is associated with the second PLMN based on receiving a cell blacklist from the first PLMN, wherein the cell blacklist includes the third cell.

* * * * *